(12) United States Patent
Paiuk (10) Patent No.: US 12,328,198 B1
(45) Date of Patent: Jun. 10, 2025

(54) DYNAMIC CONFERENCE SETTINGS FOR IN-TRANSIT DEVICES

(71) Applicant: Zoom Communications, Inc., San Jose, CA (US)

(72) Inventor: Alejandro Martin Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/461,836

(22) Filed: Sep. 6, 2023

(51) Int. Cl.
*H04L 12/18* (2006.01)
*H04L 65/403* (2022.01)

(52) U.S. Cl.
CPC ...... *H04L 12/1818* (2013.01); *H04L 12/1831* (2013.01); *H04L 65/403* (2013.01); *H04L 12/1827* (2013.01)

(58) Field of Classification Search
None
See application file for complete search history.

(56) References Cited

U.S. PATENT DOCUMENTS

| | | | |
|---|---|---|---|
| 8,712,810 B2 | 4/2014 | Meisels et al. | |
| 10,362,068 B2 | 7/2019 | Sugioka et al. | |
| 2009/0316681 A1 | 12/2009 | Hehmeyer et al. | |
| 2010/0121666 A1* | 5/2010 | Niazi | H04L 12/1818 705/7.27 |
| 2010/0124322 A1* | 5/2010 | Bill | G06Q 10/00 379/203.01 |
| 2011/0195699 A1 | 8/2011 | Tadayon et al. | |
| 2015/0381818 A1* | 12/2015 | Kaplan | H04L 12/1831 455/416 |
| 2017/0223064 A1* | 8/2017 | Le Devehat | G06F 3/04847 |
| 2018/0176383 A1* | 6/2018 | Kumar | H04W 4/029 |
| 2020/0112450 A1* | 4/2020 | Chhabra | H04L 65/403 |
| 2022/0327494 A1* | 10/2022 | Deole | H04L 12/1818 |
| 2023/0068117 A1* | 3/2023 | Johnston | H04L 65/401 |
| 2023/0077283 A1* | 3/2023 | Mehta | G10L 17/18 |
| 2023/0261894 A1* | 8/2023 | Srivastava | H04L 12/1831 709/204 |

* cited by examiner

*Primary Examiner* — June Sison
(74) *Attorney, Agent, or Firm* — Young Basile Hanlon & MacFarlane, P.C.

(57) ABSTRACT

A conferencing system disables one or more conference components for a participant that is in-transit during a conference. The conferencing system receives a request to generate a calendar entry for the conference in a timeslot and obtains conference preference information (CPI) for each participant for that timeslot. The conferencing system determines that at least one participant is in-transit during the timeslot and determines one or more conference settings based on the CPI of the participant that is in-transit and generates the calendar entry for the conference. Prior to, or during the conference, the conferencing system disables one or more conference components for the participant that is in-transit based on the one or more conference settings.

18 Claims, 8 Drawing Sheets

DYNAMIC CONFERENCE SETTINGS FOR IN-TRANSIT DEVICES

FIELD

This disclosure generally relates to dynamic conference settings for devices, and, more specifically, for devices that are currently in-transit or will be in-transit at a scheduled conference time.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

With the advent of hybrid work environments, an increasing number of employees are expected to spend at least one to two days per week in the office. Requiring employees to work from the office adds the complication of commute time, which is typically an unproductive time during the work day. Moreover, employees may not be aware of others' commute times and thus may request or require others to attend a conference while in-transit during their commute or otherwise while away from their desk (e.g., at an airport or another location that may be deemed impractical for conferencing purposes). In some cases, the in-transit employee's attendance is mandatory; however, requiring their complete participation during a conference over traditional media (e.g., via video) or using conventional controls may be unsafe or impractical.

Implementations of this disclosure address problems such as these by dynamically providing conference settings for in-transit devices connecting to a conference, such as a video conference. In particular, a conferencing system configures a timebox around a time window in which a user of a device associated with the conferencing system is, or will be, in-transit. The timebox may be associated with a conference. The timebox may be configured based on one or more user preferences so that a conference scheduled during the time window will be configured with certain features being automatically disabled. These features may include features that would be distracting or impractical to use while in-transit, such as turning video cameras on, performing a screen share, or conducting a poll that requires a typed response. By automatically disabling certain features based on the user's transit status, the conferencing system enables the user to participate in the conference while in-transit and remain productive.

Figure 1:
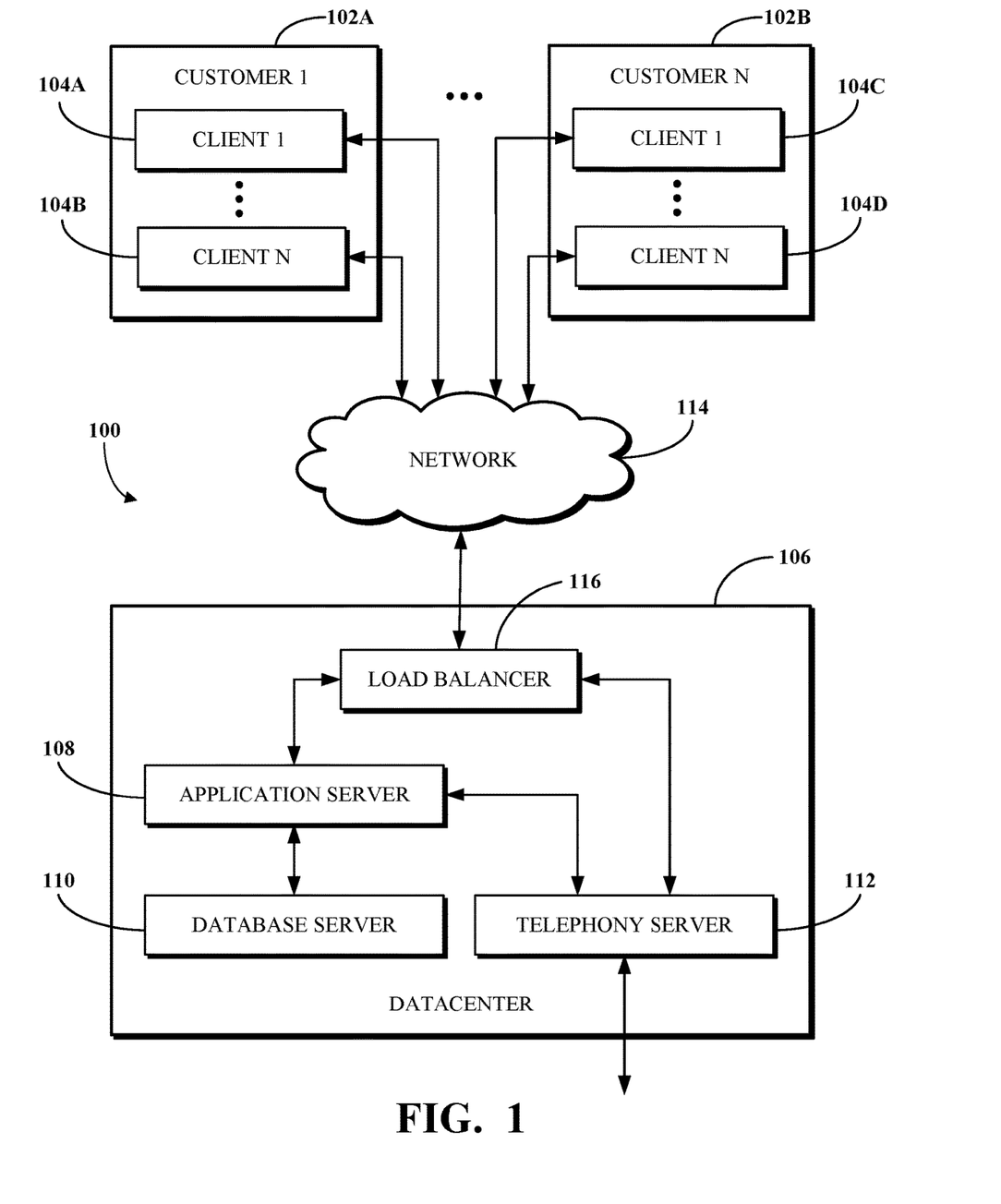
FIG. 1 is a block diagram of an example of an electronic computing and communications system.

To describe some implementations in greater detail, reference is first made to examples of hardware and software structures used to implement a system for dynamically configuring one or more conference settings for devices that are in-transit during a conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside of the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
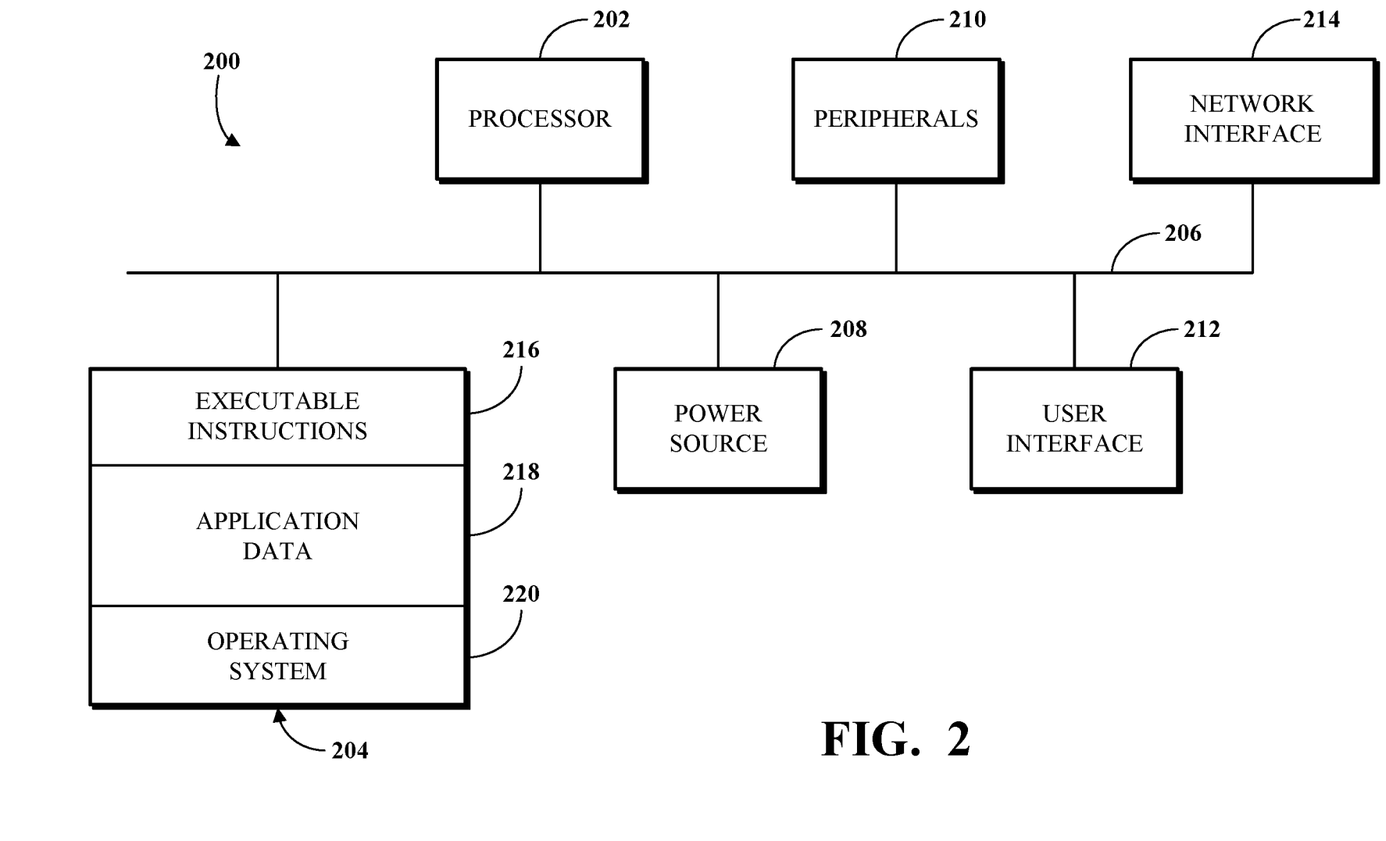
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
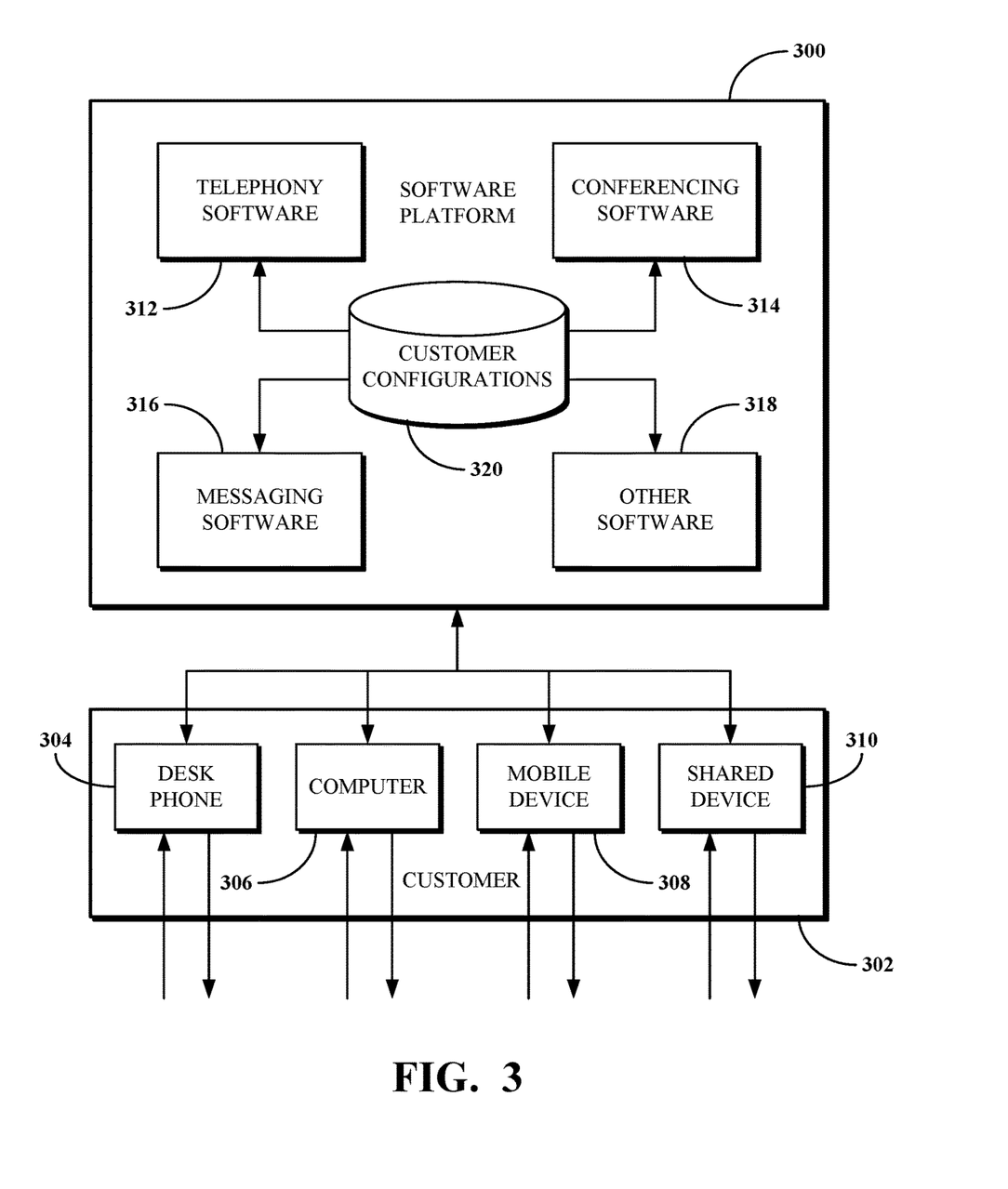
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality for dynamically configuring one or more conference settings for devices that are in-transit during a conference.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
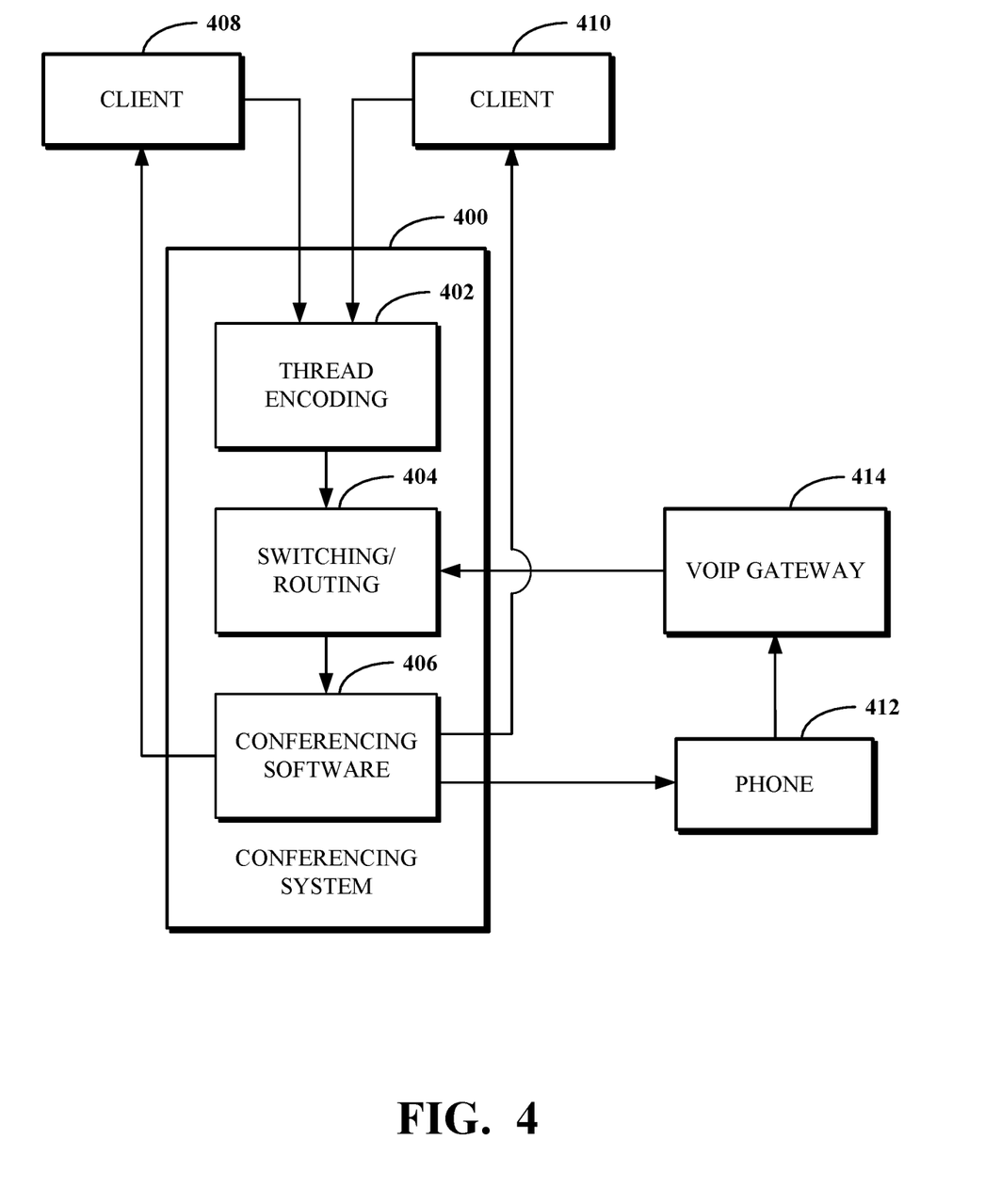
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant accesses the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5A:
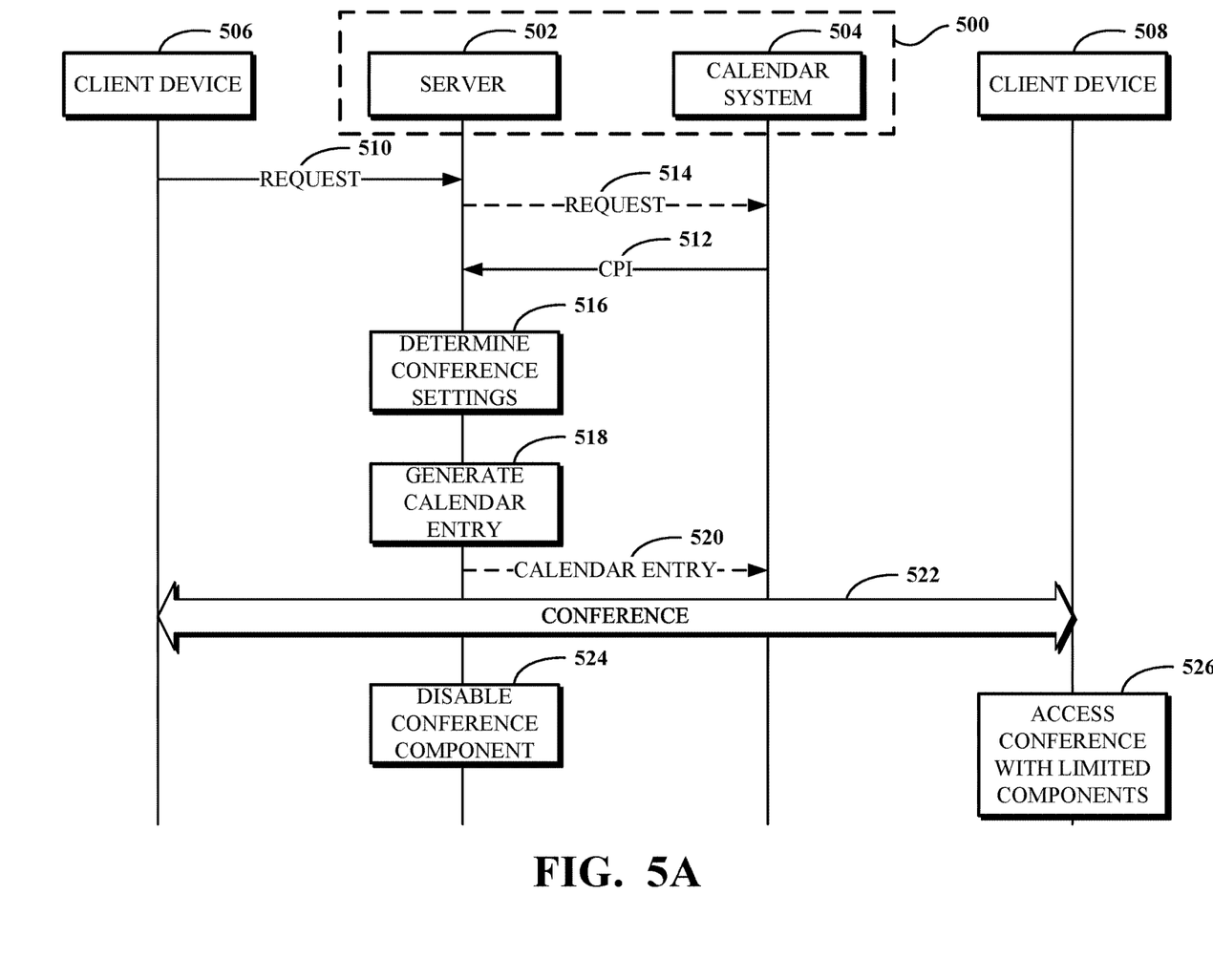
FIG. 5A is a swim lane diagram of an example of a conferencing system configured to provide dynamic conference settings to in-transit devices.

FIG. 5A is a swim lane diagram of an example of a conferencing system 500 configured to provide dynamic conference settings to in-transit devices. The conferencing system 500 may, for example, be the conferencing system 400 shown in FIG. 4. As shown in FIG. 5A, the conferencing system 500 may include a server 502 and a calendar system 504. The server 502 may be a hardware server or implemented as software. The calendar system 504 may include or otherwise access a database server, such as the database server 110 shown in FIG. 1, that stores calendar records of users of the system 500. In some examples, the calendar system 504 may be implemented as a component of the server 502.

The server 502 includes conferencing software, such as conferencing software 314 shown in FIG. 3. The conferencing software is configured to enable audio, video, and/or other forms of conferences between multiple participants, such as users of client device 506 and client device 508. Two client devices are shown in FIG. 5A for simplicity and clarity, and in some examples, more than two client devices may exist. The client device 506 and the client device 508 may each be one of the clients 304 to 310 shown in FIG. 3 or of similar types of client devices, whether or not corresponding to a customer of a software platform. In this example, the user of the client device 508 is, or will be, in-transit during a conference.

In this example, the client device 506 transmits a request 510 to the server 502. The request 510 is a request to generate a calendar entry for a conference. The request 510 includes an indication of a timeslot for the conference and one or more participants. The request 510 may indicate that the conference includes an audio component, a video component, a messaging component, a screen share component, a whiteboard component, a polling component, or the like or a combination thereof. In some examples, the request 510 may include an indication that the user will be in-transit during the indicated timeslot.

The server 502 receives the request 510 and obtains conference preference information (CPI) 512 for each participant for the indicated timeslot. In some examples, the server 502 may transmit a request 514 to the calendar system 504 to obtain the CPI 512. In this example, the CPI 512 indicates that the user of the client device 508 is in-transit during the indicated timeslot. The server 502 determines 516 one or more conference settings based on the CPI 512 of the user of the client device 508 that indicates that the user is in-transit during the indicated timeslot. The one or more conference settings may be associated with an audio component of the conference, a video component of the conference, a messaging component of the conference, a screen share component of the conference, a whiteboard component of the conference, a polling component of the conference, or any combination thereof. In some examples, the server 502 may transmit one or more questions for display on the client device 506. The client device 506 may transmit one or more responses to the one or more questions to the server 502, based on an input from the user of the client device 506. The server 502 receives the one or more responses and determines the one or more conference settings based on the one or more responses.

The server 502 generates 518 a calendar entry for the conference based on the one or more conference settings. The calendar entry may include an indication of one or more users that are, or will be, in-transit during the conference. The calendar entry is generated for the timeslot indicated in the request 510. In some examples, the server 502 may transmit the calendar entry 520 to the calendar system 504 for storage.

In some examples, the timeslot for the conference may be determined based on the CPI 512 of the user of the client device 508 such that the conference is scheduled when the user of the client device 508 is in-transit. The system 500 may use an artificial intelligence (AI) scheduler to determine which scheduled conferences would require more focus and attention of the user of the client device 508 to schedule conferences that require less focus and attention of the user of the client device 508 while the user is in-transit. For example, the AI scheduler may make this determination based on the agenda, other participants, past conferences, or any combination thereof. The AI scheduler may determine a focus score based on one or more of these parameters and compare the focus score to a threshold to make the determination of which conferences require more focus and attention of the user of the client device 508.

The server 502 is configured to facilitate the conference 522 between the client device 506 and the client device 508. The server 502 is configured to disable 524 one or more conference components for the client device 508 based on the one or more conference settings. The client device 508 can then access 526 the conference 522 with limited conference components enabled. For example, one or more of the video component of the conference, the messaging component of the conference, the screen share component of the conference, the whiteboard component of the conference, the polling component of the conference, or any combination thereof, can be disabled when the user of the client device 508 is in-transit during the conference.

In an example, the CPI of the user of the client device 508 may indicate that a pre-authorization request is automatically transmitted to the client device 506 that indicates that the conference is recorded when the user of the client device 508 is in-transit. The pre-authorization request to record the conference may be transmitted to the client device 506 prior to the start of the conference or when the client device 508 joins the conference. The pre-authorization request may be transmitted to the client device 506 via a message in an in-conference chat. The pre-authorization request may also request pre-authorization for access to the conference recording. If the pre-authorization request is not granted, the client device 508 may automatically transmit an authorization request after the conclusion of the conference to access the conference recording. The conference recording may include one or more segments that are tagged where a screen was shared so that the user of the client device 508 can specifically watch the portions of the conference that s/he was unable to fully participate in while in-transit.

In another example, the CPI of the user of the client device 508 may indicate that conferences while the user is in-transit enable a single-speaker mode whereby only one participant of the conference is enabled to speak at a time. The participant that is enabled to speak when the conference is in the single-speaker mode must either transfer the privilege to speak to another participant, drop the privilege to be picked up by the next participant that wishes to speak, or in some cases be forced (by the host or anonymously voted majority) to drop the privilege. The participant that is in-transit may request the privilege of speaking during single-speaker mode, for example, using a voice request. The voice request may include a passkey if a confirmation is required (e.g., when passkey confirmation is enabled). If the participant that is enabled to speak when the conference is in single-speaker mode leaves the conference, the privilege may be picked up by the next participant that wishes to speak. The single-speaker mode allows any participant that is in-transit the freedom from having to unmute themselves every time they speak, and prevents other participants from interrupting since there can be higher audio latency when the speaking participant is in-transit (e.g., while driving at high speeds). While being offered the privilege to speak during the single-speaker mode, the participant may accept the privilege using a voice command. The participant that is in-transit may relinquish the privilege of speaking during single-speaker mode, for example, using a voice command, accepting a request from another participant via a voice command, or the system may detect a period of silence that meets a threshold.

In another example, the quality of service (QoS) of the device of the participant in-transit may be displayed to other participants in the conference. By displaying the QoS of the device, the other participants of the conference are automatically alerted that the participant is in-transit and notified of the connection strength of the device of the participant in-transit. This may be useful when single-speaker mode is not enabled because participants typically manually time their speaking so as not to interrupt a speaking participant that is experiencing latency. The device of the participant in-transit indicates its QoS such that the other participants can calibrate their timing of when to speak based on the latency that the device of the participant in-transit is experiencing. In addition, AI or machine learning (ML) may be used to predict when it is safe to speak based on the latency of the device of the participant in-transit and the user's speaking patterns. For example, the system may provide a visual indicator, such as a light, to indicate when it is safe to speak. In some examples, an audible or haptic indicator may be used to indicate when it is safe to speak.

Figure 5B:
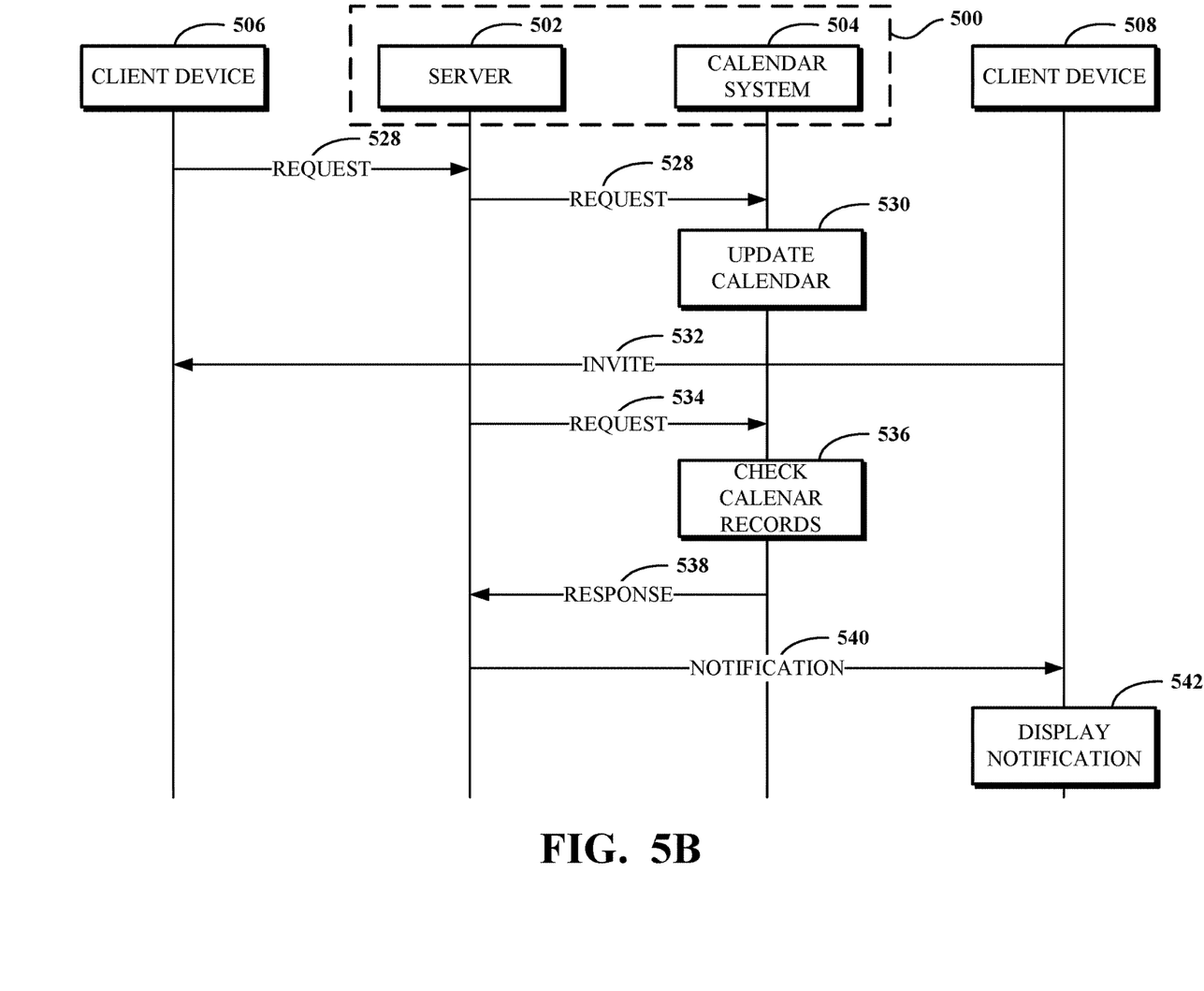
FIG. 5B is a swim lane diagram of another example of the conferencing system shown in FIG. 5A that is configured to provide dynamic conference settings to in-transit devices.

FIG. 5B is a swim lane diagram of another example of the conferencing system 500 shown in FIG. 5A that is configured to provide dynamic conference settings to in-transit devices. In this example, the client device 506 transmits a request 528 to the server 502 that indicates that the user of the client device 506 will be in-transit during a timeslot. The server 502 receives the request 528 and forwards the request 528 to the calendar system 504. The calendar system 504 receives the request 528 and updates 530 the calendar record of the user of the client device 506 indicating that the user of the client device 506 will be in-transit during the timeslot.

At some point in time, the client device 508 transmits an invite 532 for a conference to the client device 506 via the server 502. The invite 532 may include one or more users (e.g., invitees to the conference), a date for the conference, a timeslot for the conference, a transit status for the user of the client device 508 during the conference, or any combination thereof. The server 502 receives the invite 532 for the conference and transmits a request 534 to the calendar system 504. The request 534 causes the calendar system 504 to check 536 the calendar records of the users indicated in the invite 532. In this example, the calendar system 504 determines that the timeslot of the conference overlaps with the timeslot in which the user of the client device 506 will be in-transit. The calendar system 504 transmits a response 538 to the server. The response 538 indicates that the user of the client device 506 will be in-transit during the conference. The server 502 receives the response 538 and transmits a notification 540 to the client device 508. The notification 540 indicates that the user of the client device 506 will be in-transit during the conference and that the client device

506 will have limited functionality for the conference. The client device 508 is configured to display 542 the notification 540 on a display of the client device 508. The notification 540 may include an option for the user of the client device 508 to reschedule the conference.

Figure 6:
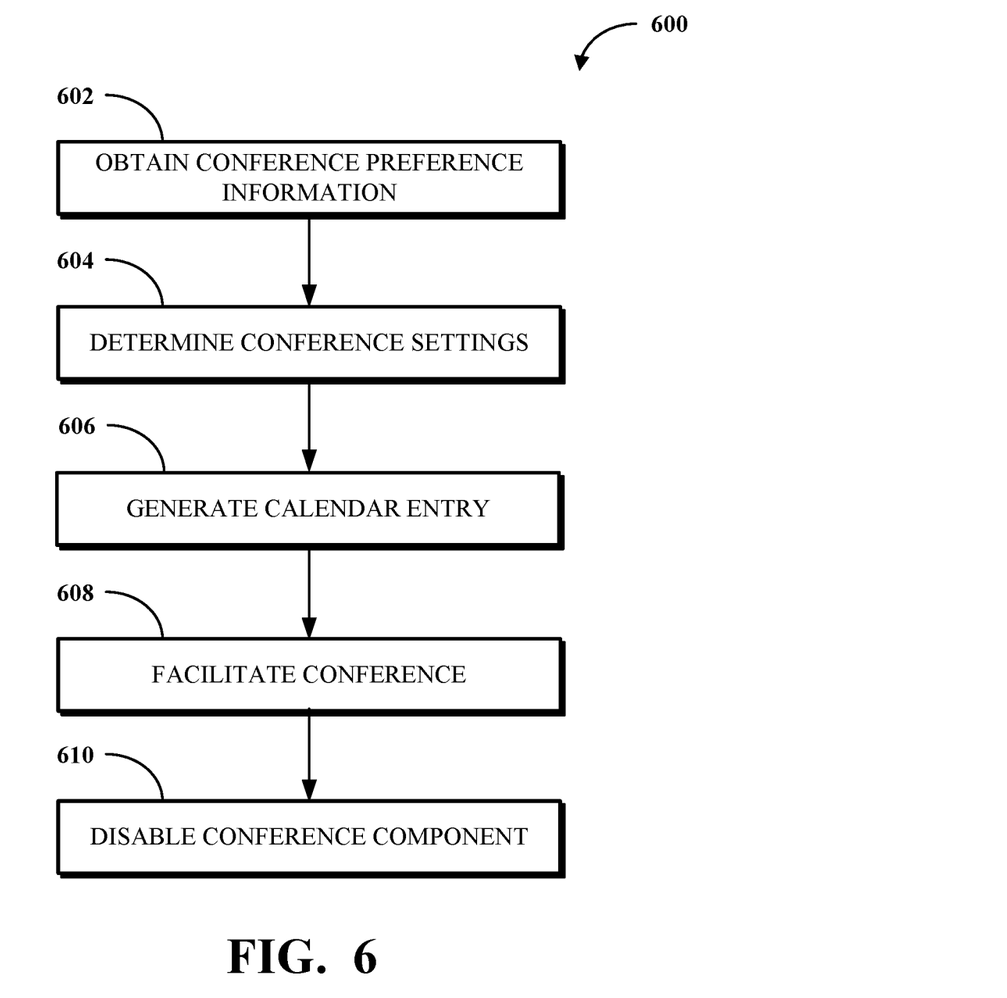
FIG. 6 is a flowchart of an example of a method for providing dynamic conference settings to in-transit devices.
Figure 7:
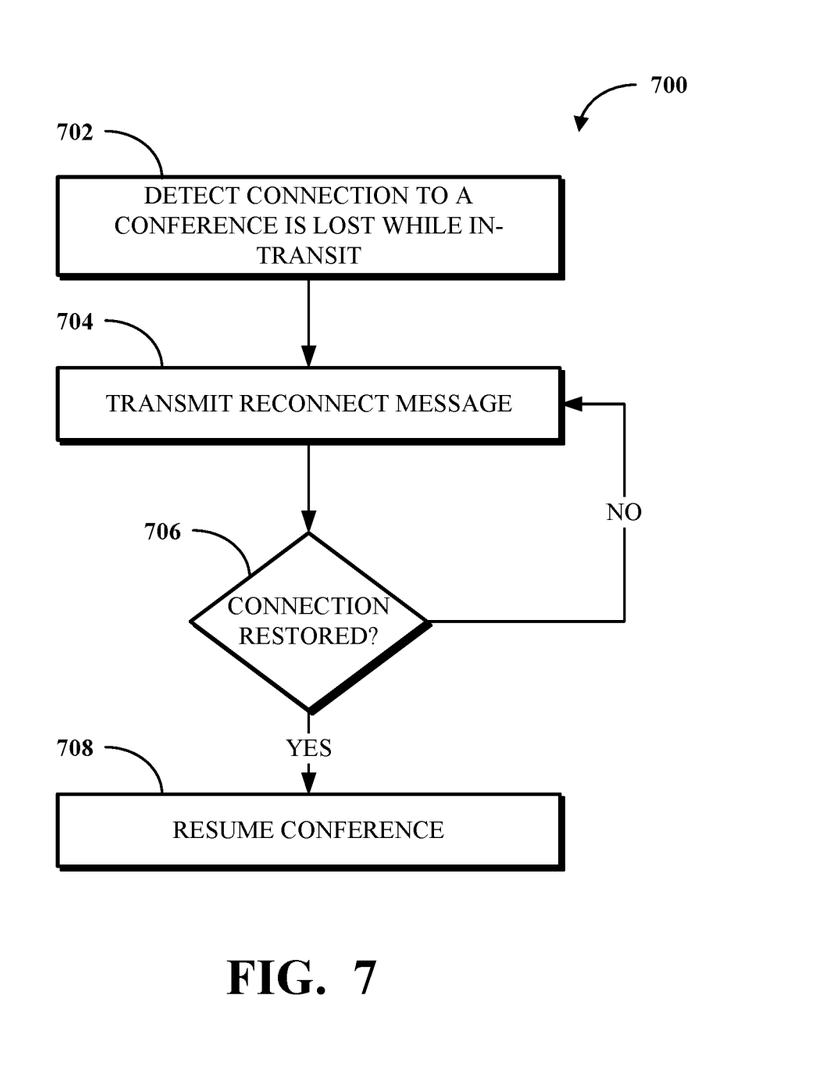
FIG. 7 is a flowchart of an example of method for reconnecting to a conference while in-transit.

To further describe some implementations in greater detail, reference is next made to examples of techniques which may be performed by or using a system for dynamically configuring one or more conference settings for devices that are in-transit during a conference. FIGS. 6 and 7 are flowcharts of examples of techniques that can be executed using computing devices, such as the systems, hardware, and software described with respect to FIGS. 1-5B. The techniques can be performed, for example, by executing a machine-readable program or other computer-executable instructions, such as routines, instructions, programs, or other code. The steps, or operations, of the techniques, or another technique, method, process, or algorithm described in connection with the implementations disclosed herein can be implemented directly in hardware, firmware, software executed by hardware, circuitry, or a combination thereof.

For simplicity of explanation, the techniques are depicted and described herein as a series of steps or operations. However, the steps or operations of the techniques in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 6 is a flowchart of an example of a method 600 for providing dynamic conference settings to in-transit devices. At 602, the method 600 includes obtaining CPI. The CPI may be obtained from a calendar system of a software platform. The obtained CPI may be associated with a timeslot of a conference and indicate that one or more participants of the conference may be in-transit during the conference. The conference may include an audio component, a video component, a messaging component, a polling component, another conference component, or any combination thereof.

At 604, the method 600 includes determining one or more conference settings. The one or more conference settings may be determined based on the CPI(s) of one or more traveling participants (i.e., one or more participants that are in-transit during the conference). At 606, the method 600 includes generating a calendar entry for the conference. The calendar entry for the conference may be generated based on the one or more conference settings. In an example, a timeslot for the calendar entry may be determined based on the CPI(s) of the one or more traveling participants such that the conference is scheduled for a timeslot where at least one of the traveling participants is in-transit.

At 608, the method 600 incudes facilitating the conference between devices of the participants. Facilitating the conference may include enabling audio communication, video communication, and/or other forms of communication between devices of multiple participants. At 610, the method 610 includes disabling one or more conference components for the traveling participants that are in transit during the timeslot based on the one or more settings. The one or more conference components may include the video component, the messaging component, the polling component, or another conference component.

While a participant of a conference is in-transit, the connection to the conference may be lost on occasion, for example, while moving through a wireless connectivity dead zone. FIG. 7 is a flowchart of an example of method 700 for automatically reconnecting to a conference while in-transit. At 702, the method 700 includes detecting, at a client device of the participant, that a connection to a conference is lost while in-transit.

At 704, the method 700 includes the client device transmitting a reconnect message to a server of a software platform to reconnect to the conference. The reconnect message may include a device identifier (ID) of the client device, a conference ID, an indicator that the user of the client device is in-transit, an indicator that the reconnect message is associated with a reconnection attempt, or any combination thereof. In some examples, the reconnection message may be transmitted by the server. For example, the server may transmit the reconnection message to the client device as an outbound call.

At 706, the method 700 includes determining whether the connection is restored. The determination of whether the connection is restored may be based on receiving an acknowledgement (ACK) or a connections successful message from the server. If the client device determines that the connection is not restored, the client device transmits another reconnect message. Reconnect messages may be transmitted until the connection is restored or until a threshold number of reconnect messages have been transmitted. The threshold number of reconnect messages may be based on a user or an administrator setting.

If the client device determines that the connection is restored, the method 700 at 708 includes resuming the conference. The client device may resume the conference by bypassing a waiting room of the conference, for example, based on the indicator that the reconnect message is associated with a reconnection attempt.

In some examples, AI or ML can be used to learn patterns of when and/or where connections are lost while the client device is in-transit and/or the durations of previous lost connections at the same location. The AI and/or ML models may be based on supervised learning models or unsupervised learning models. The learned patterns of lost connections may be based on global positioning system (GPS) data of the client device. In these examples, the client device or the server may automatically transmit a notification to other participants of the conference that the client device will temporarily lose its connection to the conference based on the GPS data of the client device. A timer may be displayed on the devices of the other participants showing when the participant is expected to reconnect to the conference. The timer may be based on the GPS data of the client device, the speed at which the client device is traveling, a learned duration pattern of connection loss, or any combination thereof. In some examples, the conference may automatically end when the participant reaches their destination based on the GPS data. In these examples, a notification may be transmitted to other participant devices that indicates when the conference will end and may provide a countdown timer. An override option may be enabled to circumvent the automatic shutoff of the conference in some cases. In other examples, the conference session from the participant device that is in-transit may be automatically transferred to another client device at the destination based on the GPS data (e.g. when taking a call on the way to the office, the call is automatically transferred to the computer from the mobile device once the computer has booted up along with the conference client software).

In some examples, if the client device is unable to automatically reconnect to the conference, and if the user of the client device is the host of the conference, the server may implement an automated agent to automatically coordinate with the other participants of the conference to reschedule the conference and transmit an invitation for the rescheduled conference. If the user is not the host, but is a key participant such that the conference could not have continued without the user, the automated agent may transmit a message to the other participants that indicates other dates and times to reschedule the conference.

An aspect may include a method that includes receiving a request to generate a calendar entry for a conference that includes an audio component and a video component. The request may include a timeslot for the conference. The method may include obtaining, for each participant of participants of the conference, respective CPI associated with the timeslot. The CPI of a participant of the participants may indicate that the participant is in-transit during the timeslot. The method may include determining one or more conference settings based on the CPI of the participant. The method may include generating the calendar entry for the conference based on the one or more conference settings. The method may include facilitating the conference between devices of the participants. The method may include disabling the video component of the conference for the participant during the timeslot based on the one or more conference settings.

An aspect may include a system that comprises a server. The server may be configured to receive a request to generate a calendar entry for a conference from a client device, wherein the conference includes an audio component and a video component. The request may include a timeslot for the conference. The server may be configured to obtain, for each participant of participants of the conference, respective CPI associated with the timeslot. The CPI of a participant of the participants may indicate that the participant is in-transit during the timeslot. The server may be configured to determine one or more conference settings based on the CPI of the participant. The server may be configured to generate the calendar entry for the conference based on the one or more conference settings. The server may be configured to facilitate the conference between devices of the participants. The server may be configured to disable the video component of the conference for the participant during the timeslot based on the one or more conference settings.

An aspect may include a non-transitory computer-readable medium comprising instructions stored on a memory, that when executed by a processor, cause the processor to perform operations. The operations may include receiving a request to generate a calendar entry for a conference that includes an audio component and a video component. The request may include a timeslot for the conference. The operations may include obtaining, for each participant of participants of the conference, respective CPI associated with the timeslot. The CPI of a participant of the participants may indicate that the participant is in-transit during the timeslot. The operations may include determining one or more conference settings based on the CPI of the participant. The operations may include generating the calendar entry for the conference based on the one or more conference settings. The operations may include facilitating the conference between devices of the participants. The operations may include disabling the video component of the conference for the participant during the timeslot based on the one or more conference settings.

In one or more aspects, the conference may include a messaging component, and the messaging component of the conference may be disabled for the participant during the timeslot. The messaging component may be disabled based on the one or more conference settings. In one or more aspects, the conference may include a polling component, and the polling component may be disabled for the participant during the timeslot. The polling component may be disabled based on the one or more conference settings. In one or more aspects, one or more questions may be transmitted for display on a device from which the request is received. In one or more aspects, one or more responses to the one or more questions may be received from the device. In one or more aspects, the one or more conference settings may be determined based on the one or more responses. In one or more aspects, the timeslot for the calendar entry may be determined based on the CPI of the participant, and the conference may be scheduled for that timeslot. In one or more aspects, the conference may be automatically recorded based on the CPI of the participant that is in-transit during the timeslot. In one or more aspects, a single-speaker mode may be enabled based on the CPI of the participant, wherein the single-speaker mode allows one participant of the participants to speak at a time. In one or more aspects, the conference may be scheduled based on the CPI of the participant. In one or more aspects, a recorded conference may include one or more tags associated with a segment of the recorded conference associated with a screenshare. In one or more aspects, the conference may include a screen share component, and the screen share component may be disabled for the participant during the timeslot based on the one or more conference settings. In one or more aspects, the conference may include a whiteboard component, and the whiteboard component may be disabled for the participant during the timeslot based on the one or more conference settings. In one or more aspects, a client device or a server of the system may detect that a connection between the client device of the participant and the conference is lost and automatically restore the connection between the client device of the participant and the conference. In one or more aspects, a reconnection message may be transmitted to the client device of the participant. In one or more aspects, a reconnection message may be transmitted by the client device of the participant and received by a server of the system.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving a request to generate a calendar entry for a conference that includes an audio component and a video component, wherein the request includes a topic and a timeslot for the conference;
   obtaining, for each participant of participants of the conference, respective conference preference information (CPI) associated with the timeslot, wherein the CPI of a participant of the participants indicates that conferences while the participant is in-transit during the timeslot enables a single-speaker mode wherein only one participant of the conference is enabled to speak at a time;
   generating a focus score based on the topic, wherein the focus score is associated with an amount of user focus required for the conference;
   generating the calendar entry for the conference based on one or more conference settings and the focus score, wherein the calendar entry is generated for the timeslot when the focus score is below a threshold and the calendar entry is generated for a different timeslot when the focus score meets the threshold;
   enabling a single-speaker mode that allows one participant to speak at a time based on the CPI of the participant, wherein a participant device of the one participant is unmuted and participant devices of non-speaking participants are muted;
   facilitating the conference between devices of the participants in the single-speaker mode; and
   disabling the video component of the conference for the participant during the timeslot based on the one or more conference settings.

2. The method of claim 1, wherein the conference includes a messaging component, the method further comprising:
   disabling the messaging component of the conference for the participant during the timeslot based on the one or more conference settings.

3. The method of claim 1, wherein the conference includes a polling component, the method further comprising:
   disabling the polling component of the conference for the participant during the timeslot based on the one or more conference settings.

4. The method of claim 1, further comprising:
   transmitting one or more questions for display on a device from which the request is received;
   receiving one or more responses to the one or more questions from the device; and
   determining the one or more conference settings based on the one or more responses.

5. The method of claim 1, further comprising:
   determining the timeslot for the calendar entry based on the CPI of the participant; and
   scheduling the conference for the timeslot.

6. The method of claim 1, further comprising:
   automatically recording the conference based on the CPI of the participant that is in-transit during the timeslot.

7. A system, comprising:
   a server configured to:
      receive a request to generate a calendar entry for a conference from a client device, wherein the conference includes an audio component and a video component, and wherein the request includes a topic and a timeslot for the conference;
      obtain, for each participant of participants of the conference, respective conference preference information (CPI) associated with the timeslot, wherein the CPI of a participant of the participants indicates that conferences while the participant is in-transit during the timeslot enables a single-speaker mode wherein only one participant of the conference is enabled to speak at a time;
      determine one or more conference settings based on the CPI of the participant;
      generate a focus score based on the topic, wherein the focus score is associated with an amount of user focus required for the conference;
      generate the calendar entry for the conference based on the one or more conference settings and the focus score, wherein the calendar entry is generated for the timeslot when the focus score is below a threshold and the calendar entry is generated for a different timeslot when the focus score meets the threshold;
      enabling a single-speaker mode that allows one participant to speak at a time based on the CPI of the participant, wherein a participant device of the one participant is unmuted and participant devices of non-speaking participants are muted;

facilitate the conference between devices of the participants in the single-speaker mode; and disable the video component of the conference for the participant during the timeslot based on the one or more conference settings.

8. The system of claim 7, wherein the conference includes a messaging component, the server further configured to:

disable the messaging component of the conference for the participant.

9. The system of claim 7, wherein the conference includes a polling component, the server further configured to:

disable the polling component of the conference for the participant.

10. The system of claim 7, wherein the server is further configured to:

transmit one or more questions for display on a device from which the request is received; and determine the one or more conference settings based on a received response.

11. The system of claim 7, wherein the server is further configured to:

schedule the conference based on the CPI of the participant.

12. The system of claim 7, wherein the server is further configured to:

automatically record the conference based on the CPI of the participant that is in-transit during the timeslot, wherein the recorded conference includes one or more tags associated with a segment of the recorded conference associated with a screen share.

13. A non-transitory computer-readable medium comprising instructions stored on a memory, that when executed by a processor, cause the processor to perform operations comprising:

receiving a request to generate a calendar entry for a conference that includes an audio component and a video component, and wherein the request includes a topic and a timeslot for the conference;

obtaining, for each participant of participants of the conference, respective conference preference information (CPI) associated with the timeslot, wherein the CPI of a participant of the participants indicates that conferences while the participant is in-transit during the timeslot enables a single-speaker mode wherein only one participant of the conference is enabled to speak at a time;

determining one or more conference settings based on the CPI of the participant;

generating a focus score based on the topic, wherein the focus score is associated with an amount of user focus required for the conference;

generating the calendar entry for the conference based on the one or more conference settings and the focus score, wherein the calendar entry is generated for the timeslot when the focus score is below a threshold and the calendar entry is generated for a different timeslot when the focus score meets the threshold;

enabling a single-speaker mode that allows one participant to speak at a time based on CPI of the participant, wherein a participant device of the one participant is unmuted and participant devices of non-speaking participants are muted;

facilitating the conference between devices of the participants in the single-speaker mode; and disabling the video component of the conference for the participant during the timeslot based on the one or more conference settings.

14. The non-transitory computer-readable medium of claim 13, wherein the conference includes a screen share component, the operations further comprising:

disabling the screen share component of the conference for the participant during the timeslot based on the one or more conference settings.

15. The non-transitory computer-readable medium of claim 13, wherein the conference includes a whiteboard component, the operations further comprising:

disabling the whiteboard component of the conference for the participant during the timeslot based on the one or more conference settings.

16. The non-transitory computer-readable medium of claim 13, the operations further comprising:

detecting that a connection between a client device of the participant and the conference is lost; and automatically restoring the connection between the client device of the participant and the conference.

17. The non-transitory computer-readable medium of claim 13, the operations further comprising:

detecting that a connection between a client device of the participant and the conference is lost;

transmitting a reconnection message to the client device of the participant; and automatically restoring the connection between the client device of the participant and the conference.

18. The non-transitory computer-readable medium of claim 13, the operations further comprising:

detecting that a connection between a client device of the participant and the conference is lost;

receiving a reconnection message from the client device of the participant; and automatically restoring the connection between the client device of the participant and the conference based on the reconnection message.

* * * * *